United States Patent [19]

Miyamae

[11] 4,159,816
[45] Jul. 3, 1979

[54] COLLAPSIBLE UNIVERSAL FISHING ROD HOLDING APPARATUS

[76] Inventor: Toshiaki Miyamae, 36-8, Aramoto, Higashi-Osaka, Osaka, Japan

[21] Appl. No.: 861,575

[22] Filed: Dec. 19, 1977

[51] Int. Cl.² .............................................. A01K 97/10
[52] U.S. Cl. ................................... 248/515; 248/528; 248/226.1; 248/226.4; 43/21.2
[58] Field of Search ................ 43/21.2; 248/511, 514, 248/515, 516, 517, 528, 533, 534, 535, 538, 225.3, 226.1, 226.4

[56] References Cited

U.S. PATENT DOCUMENTS

| 1,759,858 | 5/1930 | Kutz | 248/226.4 |
| 2,199,034 | 4/1940 | Witczak | 248/514 |
| 2,899,155 | 8/1959 | Rogers | 248/514 |
| 3,006,588 | 10/1961 | Lemi | 248/515 X |
| 3,927,487 | 12/1975 | Miyamae | 43/21.2 |

*Primary Examiner*—Lawrence J. Staab

[57] ABSTRACT

A collapsible universal fishing rod holding apparatus for a fishing boat, including a platform provided at one side with a vice mechanism capable of holding a selected gunnel portion of the boat under vertical and lateral pressure subject to the cross-sectioned shape of the portion, and at the other side with a base plate pivoted adjacent to an end of the platform in vertically movable relation with respect to the plane of the platform, a receiving plate pivoted on the base plate to move in parallelism with the plane thereof, a rod holder detachably inserted into the receiving plate and a supporting means pivoted adjacent to the other end of the platform so as to telescopically support a fishing rod at a desired level, wherein the rod holder connected to the fishing rod is adapted to be detachably engageable through its extension with the receiving plate, permitting the rod to move alternatively into vertical relation with respect to the platform or in parallel relation with respect to the plate thereof. According to the invention, the apparatus can be made into a less bulky form handy to carry by folding each elemental parts of the apparatus to the platform.

3 Claims, 3 Drawing Figures

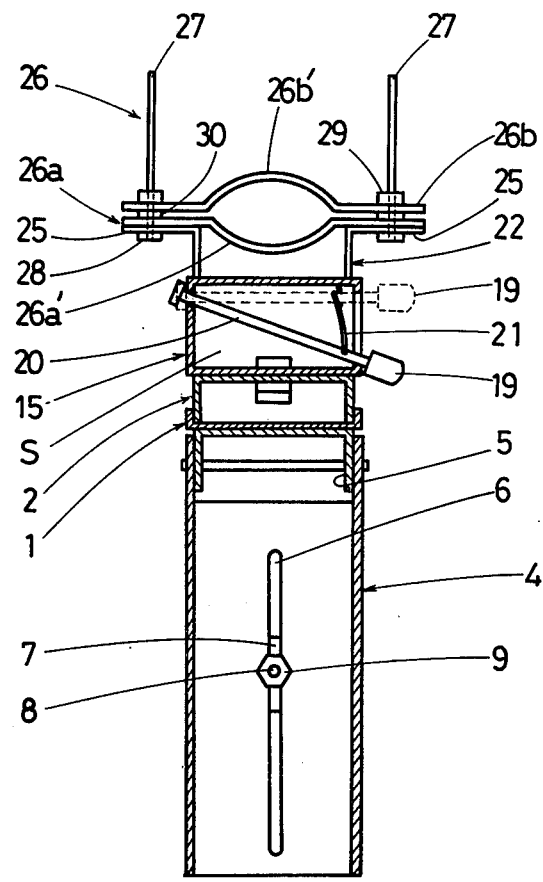
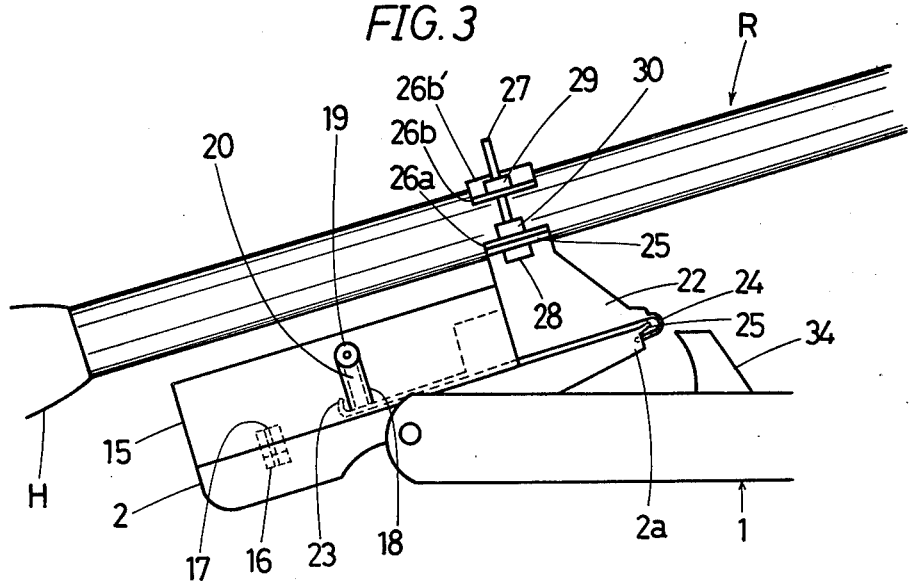

COLLAPSIBLE UNIVERSAL FISHING ROD HOLDING APPARATUS

BACKGROUND OF THE INVENTION

The present invention relates generally to a collapsible universal fishing rod holding apparatus usable for enjoying fishing by dropping a fishing line through the rod into the sea from a fishing boat, and more particularly it relates to an apparatus designed to be detachably fixed about the centroid of a fishing rod so as to permit the fishing rod to be stably supported on any edge of the gunnel of the boat in any desired direction and operate the rod selectively in vertical relation with respect to the apparatus and in parallel relation with respect to the plane thereof.

In order to enjoy offshore fishing by boat it is customary with fishermen to drop a fishing line deep in the sea from the foremost end of a fishing rod. For this purpose, fishermen must for a long while hold the grip portion of the fishing rod from which a long length of fishing line is extended into the sea. Thus such an arrangement is, more often than not, physically and psychologically tiring due to the long wait for a fish to be caught while grasping the fishing rod with one hand in a seated or standing posture so that, as a matter of course, they generally put the fishing rod on the most accessible edge of the gunnel of the boat until a fish takes the bait. In this case, however, the boat is always rolling or pitching on the sea and the fishing rod unstably placed on the edge is easily moved along the edge and often falls onto the sea surface.

STATEMENT OF OBJECTS

The present invention has been devised to eliminate the abovementioned drawbacks and disadvantages, having as one of its main objects the provision of a fishing rod holding apparatus capable of being detachably mounted to a selected gunnel portion of a fishing boat subject to the cross-sectioned shape thereof.

Another object of the invention is to provide a fishing rod holding apparatus to which a fishing rod can be detachably mounted.

Another object of the invention is to provide a universal fishing rod holding apparatus wherein the fishing rod is normally held in state state and, if necessary, movable in vertical or parallel relation with respect to the plane of the apparatus.

A further object of the invention is to provide a collapsible fishing rod holding apparatus that can be folded dimensionally into a small form easy to carry.

A still further object of the invention is to provide a collapsible universal fishing rod holding apparatus simple in structure, easy of operation and low at the cost of manufacture.

STATEMENT OF INVENTION TO DRAWINGS

These and other objects, features and advantages of the present invention will become apparent from the following detailed description of the invention when taken in conjunction with the accompanying drawings, in which:

FIG. 2 is an enlarged vertical section view showing elemental parts of the apparatus in FIG. 1; and FIG. 3 is likewise a greatly enlarged detailed vertical section view showing other elemental parts of the apparatus in FIG. 1.

DETAILED DESCRIPTION OF INVENTION

Figure 1:
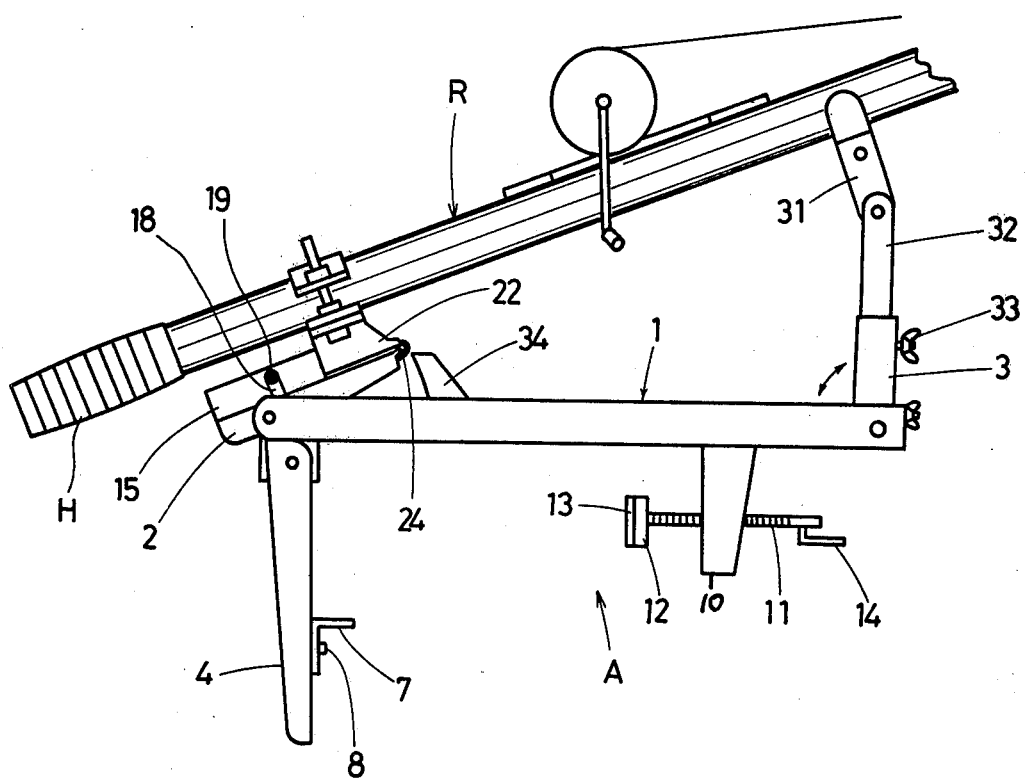
FIG. 1 is a vertical section view showing as the whole the collapsible universal fishing rod holding apparatus embodied in accordance with the invention.

Setting forth now in details a few preferred embodiments of the present invention with reference to the accompanying drawings, reference character A generally designates a fishing rod holding apparatus or a main body of the invention. Said main body A comprises a vertically sectioned U shape platform 1 having an end pivotally supporting a vertically sectioned reverse U shape base plate 2. In the other end of the platform 1 there is pivotally supported a rod supporting means 3 while an adjustable fixture plate 4 is also pivoted on a bracket 5 rigidly fixed on the platform 1 at the opposite side to said base plate 2.

Axially in the intermediate portion of said adjustable fixture plate 4 there is formed a slit 6 wherein a slidable bracket 7 is slidably supported to be screwably tightened to the plate 4 by means of a bolt 8 and a nut 9.

The portion of the platform 1 opposite to said adjustable fixture plate 4 is bored with a plurality of through holes (not shown) arranged axially in two rows at suitably spaced apart intervals so as to locate a bracket 10 in a desired position of the platform 1. Through said bracket 10 a screw bolt 11 is screwably inserted in parallel relation with the platform 1. On one end of said screw bolt 11 a free jaw 12 is supported movably in free directions, having the outer surface covered with such a cushion material 13 for example as a rubber sheet while on the other end there is rigidly fixed a L-shape handle 14, thus forming a so-called vice means capable of firmly holding the gunwale portion of a fishing boat relatively to the vertical-sectioned shape of the gunwale portion of the adjustable fixture means 4 and the free jaw 12 by manually operating the handle 14. In this case, the gunwale portion forcibly pressed by the free jaw 12 is prevented from being impaired under the protection by the cushion material 13 covering the free jaw 12.

Further, said sliding bracket 7 slidably supported in the slit 6 is adapted to be rigidly tightened to the adjustable fixture means 4 in a suitable position of the slit 6 by screwably tightening the nut 9 on the screw bolt 8 thereby making it possible to firmly hold the gunwale portion between the platform 1 and the sliding bracket 7 in vertical direction with respect to the gunwale.

As shown in FIGS. 1 to 3 inclusive, a rod holder receiving plate 15 is pivotally supported on the base plate 2 by means of nuts 16 and a bolt 17. Said plate 15 is a rectangular shape in vertical section and formed at one side substantially intermediate thereof with a slit 18 through which a head 19 is protruded outwardly of said one side. Said head 19 is connected to a traversing rod 20 which is held between the both sides of the rod holder receiving plate 15 by means of a spring 21 resiliently mounted around said slit 18 so as to be normally pushed down to the lowermost end of the slit 18, diagonally to the end of the traversing rod 20 opposite to the head 19 as is clearly evident in FIG. 2.

Said rod holder receiving plate 15 having the abovementioned construction is adapted to slidably receive a rod holder 22 that comprises an upwardly curved tongue 23, a downwardly curved tongue 24 formed in opposite end of the formerr tongue 23 and a pair of reversely L-shape rod holder supporting plates 25 raised upright between said two tongues 23, 24 and bent outwardly at right angles to form wings extending horizontally one another in opposite directions.

In order to receive the rod holder 22 into the rod holder receiving plate 15, the head 19 of the plate 15 is pushed up by finger-tip along the slit 18 against the resilient pressure of the spring 21 while at the same time the rod holder 22 is forcibly inserted into the rectangular space S of the plate 15 until said downwardly curved tongue 24 of the rod holder 22 comes below the extremity of a tongue 25' protrudted from the base plate 2 or in other words, the upwardly curved tongue 23 goes a little far over the position wherein the head 19 should be normally held.

Thereafter the head 19 is released from the finger-tip so as to be pushed down to return to its original position by the dynamical stability of the spring 21, whereby said tongue 23 is diagonally held in check by the traversing rod 20 connected to the head 19.

Incidentally, the rod holder 22 is such that when the upwardly curved tongue 23 is forced into the innermost recess of the plate 15, passing the normal position of the head 19, the downwardly curved tongue 24 of the rod holder 22 is placed below the protructed tongue 25' of the base plate 2 to engage with bilateral edges 2a of the latter plate whereby the rod holder 22 and the rod holder receiving plate 15 are prevented to move with respect to the plane of the base plate 2 but allowed to move together with the latter plate 2 in vertical relation with respect to the platform 1.

On the other hand, when the rod holder 22 is pulled out until the upwardly curved tongue 23 is brought into contact with the traversing rod 20, the downwardly curved tongue 24 is released from the engagement with said bilateral edges 2a whereby both the rod holder 22 and the rod holder receiving plate 15 are able to move pivotally on the plane of the base plate 2 around the bolt 17 and also move together with the latter plate 2 vertically with respect to the platform 1.

Further in case of removing the rod holder 22 from the rod holder receiving plate 15, the head 19 is pushed up by finger-tip against the resilient pressure of the spring 21 to raise the traversing rod 20 thereby making way for the upwardly curved tongue 23

The rod holder 22 detachably mountable on the main body A and movable alternatively in the direction traversing the plane of the main body A or in said direction and also in the direction parallel to said plane just as has been mentioned above is adapted to support a fishing rod grasping means 26 by means of screw bolts 27 and nuts 28.

Said means 26 comprises a grasping piece 26a formed intermediately with a downwardly semi-arcuate portion 26a' and fixedly mounted on the wings of said rod holder supporting plates 25 by means of said screw bolts 27 and said nuts 28, and another grasping piece 26b, corresponding to the former piece 26a, formed intermediately with an upwardly semi-arcuate portion 26b' and screwably tightened to the piece 26a by means of the nuts 29, 30 so that a suitable portion of the fishing rod H adjacent to the grip thereof may be tightly held between these semi-arcuate portions 26a' and 26b'.

Thus in practical use of the fishing rod holding apparatus embodied in accordance with the present invention, the gunwale portion or any other suitable portion of a fishing boat in a selected position is held under pressure, across the axial direction thereof, between the adjustable fixture plate 4 and the free jaw 12 selectively positioned on the platform 1, further being held vertically between the platform 1 and the slidable bracket 7 selectively positioned on the adjustable fixture means 4. Thereafter the rod holder 22 firmly holding the fishing rod H between the grasping pieces 26a and 26b is forced into the rod holder receiving plate 15 with the head 19 pushed up by finger-tip.

Thus it follows from this that the fishing rod H firmly held by means of the rod holder 22 detachably insertible into the rod holer receiving plate 15 is also movable freely in desired directions with respect to the plane of the platform 1 through said plate 15. The rod holder 22 is then put on a U shape supporting element 31 coupled to a supporting element 32 which is telescopically movable in the rod supporting means 3 and tightened thereto at a suitable level by means of a thumb nut 33 whereby the fishing rod H is held stable on the main body A.

Thus by use of the fishing rod holding apparatus of the invention, a fisherman is able not only to freely change his fishing direction subject to the tidal situation, the quarter from which the wind blows and the direction of a catch running about with a strong pull, but also to keep the fishing rod H upright on the main body A thereby easily replacing a bait with a fresh one on a fish hook or removing a catch from the hook without hindrance to his fellow fishermen showing the limited space of a fishing boat with him.

Further, if necessary, the downwardly curved tongue 24 of the rod holder 22 firmly holding the fishing rod R is previously disengaged from the bilateral edges 2a in the above-mentioned manner and put on a projection 34 projected from the platform 1 in front of the baseplate 2 while supporting the rod portion H on the U shape supporting element 31 so that the fishing rod H can be easily raised up by hand in response to a fish biting at the bait merely by pushing forward the grip of the fishing rod H and taking the rod holder 22 off the base plate 2.

Further when not in use, the fishing rod holding apparatus of the invention may be made into a small size by folding down the adjustable plate 4, the rod holder receiving plate 15 pivotally supported on the base plate 2 and the rod supporting means 3, respectively, to the platform 1, with an additional advantage that the rod holder 22 may be kept inserted into the receiving plate 15 or otherwise rigidly fixed to the fishing rod H.

It is to be understood that the invention is not limited in its application to the details of construction and arrangement of parts illustrated in the accompanying drawings, since the invention is capable of other embodiments and of being pradticed or carried out in various ways. Also it is to be understood that the phraselogy or terminology employed herein is for the purpose of description and not of limitation.

What is claimed is:

1. A collapsible universal fishing rod holding apparatus, comprising a platform provided adjacent to one end of said apparatus with a long leg portion pivotally movable about said one end to a position at right angles to the plane of said platform, said platform at a selected position opposite to said one end being provided with a short leg portion movable parallel to said platform; a base plate pivotally supported on a first axis at said one end of said platform and being movable relative to the plane of said platform; a receiving means supported on the plane of said base plate for movement about a second axis perpendicular to the plane of said base plate; a rod holder means fixed on said receiving means and adapted to hold a fishing rod portion in screwably tightened relation; and a telescopic fishing rod supporting means pivotally supported at said opposite end of said platform and movable to a position at right angles to said plane of said platform; wherein said base plate has downwardly extending bilateral edges; said receiving means having an inner rectangular space and being supported on said base plate in movable relation with respect to the plane thereof, with a slit formed substantially intermediate of one side of said receiving means across the axis thereof; and wherein there is provided a traversing rod extending from said slit across said space and having an end supported adjacent to an upper edge of the side of said receiving means opposite to said slit, and wherein there is provided a pressure spring stretched around said slit to normally keep the other end of said traversing rod pressed down along said slit diagonally with respect to said rectangular space of said receiving means; and wherein there is provided head means connected to said other end of said traversing rod and protruding outwardly through said slit; and upwardly curved tongue formed integrally in the extremity of said base plate, said rod holder means being insertable into said receiving means through said space; and wherein said rod holder means has an upwardly curved tang integrally formed in the extremity to be insertable through said space into the inner recess of said receiving means and a downwardly curved tongue formed opposite said upwardly curved tang and being slightly longer than said upwardly curved tongue and engagable with the upwardly curved tongue between said bilateral edges of said base plate, said upwardly curved tongue being extended integrally from said base, an engagable relation between said rod holder means and said receiving means being effected by permitting said upwardly curved tang to pass beyond a normal position of said traversing rod while keeping the head of said traversing rod raised up manually against the resilience of said spring; whereby said base plate, said receiving means and said holder means are permitted to pivotally move as a unit relative to the plane of said platform by slidably engaging said downwardly curved tongue of the rod holder means with said bilateral edges of said base plate; and whereby said downwardly curved tongue is releasible from an engaged position with said edges of said base plate by slidably moving said upwardly curved tang of the rod holder means to come into contact with said traversing rod normally pressed down by the pressure force of said spring whereby said base plate, receiving means and said rod holder means are pivotally movable together relative to the plane of the platform about said first axis while permitting said receiving means and said rod holder means to rotatively move together relative to the plane of said base plate about said second axis.

2. The collapsible universal fishing rod holding apparatus, as set forth in claim 1, wherein the foremost end of said fishing rod supporting means is formed to receive a fishing rod portion.

3. The collapsible universal fishing rod holding apparatus, as set forth in claim 2, wherein said long leg portion, said base plate, and said fishing rod supporting means are all collapsible with respect to said platform.

* * * * *